Oct. 9, 1951     C. E. CHRISTOPHERSEN     2,570,644
CONTAINER ASSEMBLY
Filed July 14, 1948
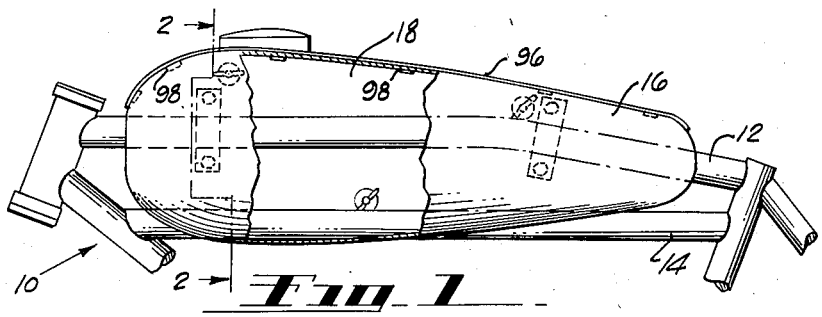
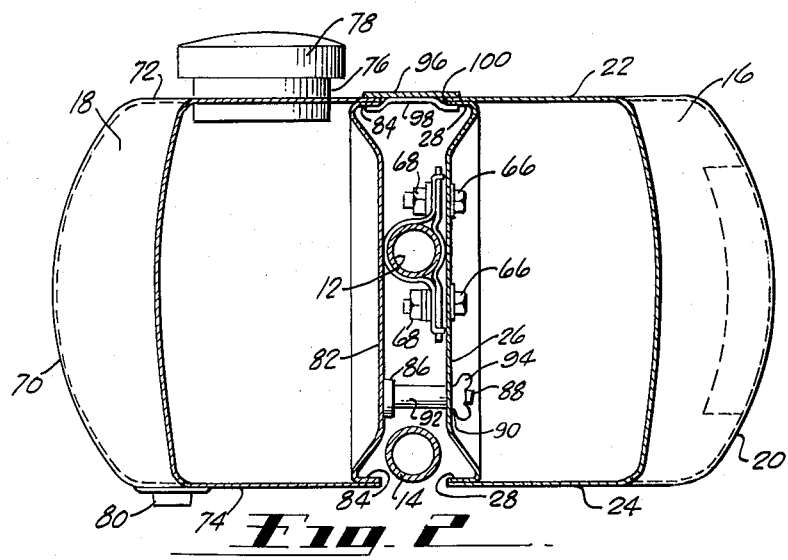
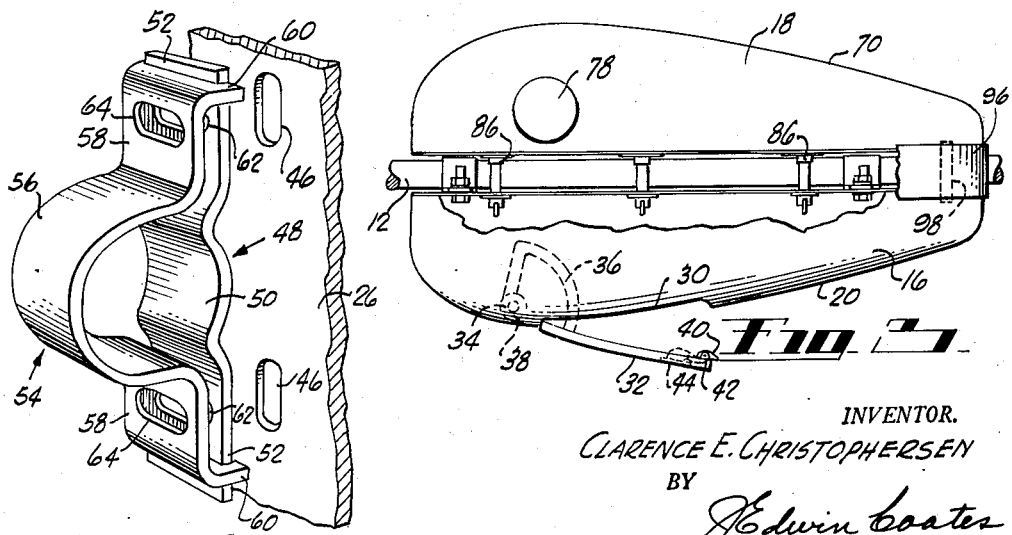
INVENTOR.
CLARENCE E. CHRISTOPHERSEN
BY
*J Edwin Coates*
ATTORNEY Patented Oct. 9, 1951

2,570,644

UNITED STATES PATENT OFFICE 2,570,644

CONTAINER ASSEMBLY

Clarence E. Christophersen, Inglewood, Calif., assignor, by mesne assignments, to Jack and Heintz Precision Industries, Inc., Cleveland, Ohio, a corporation of Delaware Application July 14, 1948, Serial No. 38,702

1 Claim. (Cl. 224—32.1)

This invention relates to a dual purpose container assembly for use on a motorized bicycle, and pertains more directly to a combination and arrangement of parts which provides separate and distinct containers for fuel and for accessories and tools while retaining the appearance, solidity, and firm mounting of a single container.

The conventional manner of supplying fuel to the motor of a motorized bicycle is to form a single elongated tank, sometimes with a slight longitudinal depression in its lower surface, weld a pair of simple clamps to the lower surface, and attach it directly to the cross-bar of the bicycle. It is difficult to mount it tightly enough to prevent displacement of the tank laterally about the cross-bar as an axis, and the arrangement is unsightly because practically the entire tank extends above the cross-bar. Moreover, such arrangement makes it practically impossible to carry needed tools, accessories, wiping cloths, and the like.

The present invention eliminates these difficulties and provides various advantageous features in addition. In the new construction a tank or container is mounted at each side of the cross-bar. The one tank, which is exclusively for fuel, has at least as much capacity as the conventional single tank. The second tank or container, of the same volumetric capacity, provides storage space for tools, accessories, etc., including small articles of clothing. The arrangement is such that one tank is located at each side of the cross-bar and the major portion of each tank is below the cross-bar. In most instances the bicycle on which a motor is mounted has two cross-bars and the present invention takes advantage of this fact by so locating the tanks that the second, or lower, bar serves to prevent any undue lateral movement of the tanks in the event that the clamping means becomes slightly loosened.

In the assembly and mounting of the invention, the accessory container is first attached to the cross-bar, or to the upper of two cross-bars, by a pair of clamps with fasteners extending thru a wall of the container. When it is firmly attached, the fuel container is placed on the opposite side of the bar. The fasteners for the fuel container do not pass thru its wall but are attached to the exterior surface only, as by welding, thus avoiding any possibility of leakage. The fasteners of the fuel container pass thru the adjacent wall of the accessory container and nuts are applied thereto by way of a hand hole in the outer wall of the accessory container.

Since a gap is provided to allow for the thickness of the cross-bar a cover strip is mounted along the length of the upper margin of the gap to conceal it and the bar. This strip is provided with depending means which are engaged by the margins of the two containers as they are brought together, and the entire assembly is maintained rigid by tightening up on the fasteners of the fuel container. If, as is the usual case, there are two cross-bars, the second bar will fit between the lower portions of the two containers and will prevent all but the slightest rotation of the assembly about the upper bar.

Other features and advantages of the invention will become apparent as the description proceeds. The presently preferred embodiment is illustrated in the accompanying drawing, in which:

Fig. 1 is a side elevational view of a portion of a bicycle frame with the novel container assembly mounted thereon, part of one container being broken away;

Fig. 2 is an enlarged sectional view taken along line 2—2 of Fig. 1, showing the manner of attachment of the parts of the assembly;

Fig. 3 is a top plan view of the assembly with a portion of the cover strip broken away; and Fig. 4 is an enlarged perspective view of the clamp elements for attaching the accessory container to the cross-bar.

As indicated in Fig. 1, the assembly is mounted on a bicycle frame, generally indicated at 10 and including an upper crossbar 12 and a lower crossbar 14.

Accessory tank 16 is located at one side of the cross-bar or bars and fuel tank 18 is located at the opposite side.

As best seen in Fig. 2, the tank 16 has an outer curved wall 20, together with inward extensions or walls 22 and 24, which are slightly curved. The inner wall 26 is vertical and substantially flat and is bent in a reverse curve at its periphery to provide a flange 28 substantially normal to its plane. The inner margins of the outer walls are placed in juxtaposition to the flange and permanently secured thereto, as by spot welding. The complete container so formed is provided with a hand hole or access opening 30 to provide access to the various fastening devices and also to provide for insertion of tools, accessories and the like into the container.

The access opening is provided with a door 32, hinged at 34 by means of a D-type hinge arm 36 to a bracket 38 on the inner wall of the container. A conventional latch 40, pivoted at 42 is provided with a push button operator 44.

A pair of clamping devices serve to attach the accessory container to the cross-bar. To provide for such attachment, two pairs of vertically elongated openings 46 are formed in the inner wall 26, as best seen in Fig. 4. Each clamp comprises a saddle member 48 having a central arcuate portion 50 and two flat end portions 52, and a collar member 54 having a central, complementary arcuate portion 56 and flat end portions 58. The free ends of portions 58 are flanged and partially cut away to provide detents 60 to interengage with portions 52 and prevent relative rotation and misalignment of the saddle and collar.

The saddle is provided with upper and lower horizontally elongated openings 62 and the collar is provided with corresponding openings 64. It will be apparent that when bolts are passed thru these openings, the clamps can be adjusted vertically and laterally thru a wide range with respect to the container to accommodate differences in the shape of the cross-bar 12.

Turning back to Fig. 2, it will be seen that the saddle and collar are placed around cross-bar 12 and bolts 66 are passed from the inside of container 16 thru openings 46, 62 and 64, whereupon nuts 68 are threaded on their shanks and tightened to clamp the container in position.

Fuel container 18 is formed substantially as a mirror image of container 16 so that the two are substantially symmetrical about the plane thru the two cross-bars. Container 18 has an outer curved wall 70 together with upper and lower extensions or walls 72 and 74. The upper wall has a filler neck 76 with a conventional cap 78 and the lower wall has a fuel outlet 80. The inner wall 82 is substantially flat and vertical and has a peripheral flange 84 similar to the flange 28, permanently attached to the margin of the other walls and sealed against fuel leakage, as by seam welding.

Container 18 is attached to container 16 by means of a plurality of bolts the heads 86 of which are permanently attached to wall 82 as by welding and the shanks 88 of which pass thru openings 90 in wall 26. The bolts may be shouldered to act as spacers or separate spacers 92 in the form of tubular sections may be slipped over the bolt shanks to predetermine the distance between the containers. Nuts 94 are then applied to the bolts and the assembly pulled up tight.

The construction so far described leaves an unsightly gap between the containers. This is eliminated by the provision of a cover strip 96 overlying the inner margins of the containers and extending substantially the full length of the tank as illustrated in Fig. 1. The cover strip is provided with a plurality of small, narrow, laterally extending detent strips 98 welded to its underside. Each of these strips is joggled downwardly at its two free ends to provide a space 100 between such end and the margin of the cover strip for the reception of a portion of the periphery of the flanges 28 and 84 with their associated wall members.

After container 16 is mounted in place the cover strip is pushed into position with one of its edges overlying the margin of the container and the detent strips underlying it. As container 18 is moved into position its margin is also properly engaged. When the assembly is completed the cover strip is held firmly in place and cannot be removed until the containers are disassembled. The total assembly gives the general impression of the tank on a full size motorcycle and is much more firmly mounted than the conventional type of bicycle tank. In addition it provides much needed storage space. Since the fuel tank is mounted on the accessory tank instead of on the cross-bar and the attaching bolts are straight and permanently secured to the fuel tank, there is a minimum of strain to produce subsequent leakage.

It will be apparent to those skilled in the art that various changes and modifications may be made in the construction as disclosed without departing from the spirit of the invention and it is intended that all such changes and modifications shall be embraced within the scope of the following claim.

I claim:

A unitary dual purpose container assembly adapted for mounting on the cross-bar of a motorized bicycle comprising: a first hollow, elongated accessory container having an inner wall lying substantially in a vertical plane and an outer curved wall the extensions of which are joined to said inner wall to form a flange extending inwardly substantially at right angles to the general plane of said inner wall; cross-bar clamping means adapted to engage a cross-bar and clamp said fuel container thereto; a second hollow, elongated container substantially symmetrical with said accessory container and adapted to be mounted in juxtaposition thereto and having a flange facing the flange of said accessory container; and a cover strip adapted to overlie and conceal the gap between the assembled containers; said strip having means inter-engaging with said flanges to retain said strip in position when said containers are placed in assembled relation to comprise said unitary dual purpose container assembly.

CLARENCE E. CHRISTOPHERSEN.

REFERENCES CITED

The following references are of record in the file of this patent:

UNITED STATES PATENTS

| Number | Name | Date |
| --- | --- | --- |
| 446,748 | Blood | Feb. 17, 1891 |
| 1,460,760 | McGee | July 3, 1923 |
| 1,963,333 | Morales | June 19, 1934 |
| 2,051,823 | Clarke | Aug. 25, 1936 |
| 2,423,003 | Buegeleisen | June 24, 1947 |
| 2,491,062 | Shephard | Dec. 13, 1949 |

FOREIGN PATENTS

| Number | Country | Date |
| --- | --- | --- |
| 446,331 | Great Britain | Apr. 28, 1936 |
| 446,438 | Great Britain | Apr. 30, 1936 |
| 502,494 | Great Britain | Mar. 20, 1939 |
| 325,117 | Germany | Sept. 9, 1920 |
| 201,488 | Switzerland | Feb. 16, 1939 |